United States Patent Office 3,660,474
Patented May 2, 1972

3,660,474
RESOLUTION OF AMMONIUM-N-ACETYL-DL-
α-AMINOPHENYLACETATE AND PREPARA-
TION THEREOF
Ichiro Chibata, Suita-shi, Shigeki Yamada, Toyonaka-shi,
 and Masao Yamamoto, Kyoto-fu, Japan, assignors to
 Tanabe Seiyaku Co., Ltd., Osaka, Japan
No Drawing. Filed Oct. 21, 1969, Ser. No. 868,229
Claims priority, application Japan, Mar. 28, 1969,
44/23,954
Int. Cl. C07c 103/32
U.S. Cl. 260—518 R                              16 Claims

ABSTRACT OF THE DISCLOSURE

Seed crystals of one optically active enantiomer of ammonium N-acetyl-DL-α-aminophenylacetate are added to a supersaturated solution of ammonium N-acetyl-DL-α-aminophenylacetate. Crystallization of said one optically active enantiomer results. The crystals are recovered. Alternatively, crystals of said one optically active enantiomer may be added to a hot solution of the N-acetyl-DL-α-aminophenylacetate to produce a supersaturated solution. The solution is then cooled to crystallize out said one optically active enantiometer. A combination of these two alternative procedures can be utilized. The recovered optically enantiomer ammonium N-acetyl-DL-α-aminophenylacetate can be reacted with an acid to produce optically active α-aminophenylacetic acid.

This invention relates to the resolution of ammonium N-acetyl-α-aminophenylacetate and to a process for the preparation of optically active α-aminophenylacetic acid.

D-α-aminophenylacetic acid which is one of the optical isomers of α-aminophenylacetic acid is a useful starting compound for the synthesis of penicillin compounds. The synthetic processes of producing α-aminophenylacetic acid, however, yield only the racemic modifications of said amino acid. Accordingly, it requires the resolution of said racemic reaction product into its optically active enantiomers to produce optically active α-aminophenylacetic acids.

Known methods of resolving DL-α-aminophenylacetic acid may be divided into two groups. One is the chemical methods wherein a resolving agent is employed. The other is the biochemical methods wherein the action of an enzyme is employed. These methods are, however, still too premature to be applied for purposes of commercial production. For example, optically active α-aminophenylacetic acids can be prepared chemically by treating DL-α-aminophenylacetic acid with α-camphorsulfonic acid or α-bromocamphorsulfonic acid, or treating N-formyl-DL-α-aminophenylacetic acid with cinchonin or quinine, allowing the resulting mixture of diastereiosomers to crystallize out fractionally, and liberating optically active α-aminophenylacetic acid therefrom. But these methods are disadvantageous in that the use of expensive resolving agents is required, there is not a sufficient different in solubility and incomplete resolution of the diastereoisomers is afforded. On the other hand, the biochemical methods, which comprises the asymmetrical hydrolysis of N-chloroacetyl-DL-α-aminophenylacetic acid by the action of acylase, necessarily require some biological procedures as for example, fermentation microorganisms, and the preparation of an enzyme.

A racemic modification of an organic compound can be in general resolved by selective crystallization into each of optically active enantiomers if said racemic modification exists in the form of racemic mixture, or in the form of racemic compound having much higher solubility than each of the corresponding optically active enantiomers. However, it is impossible to predict whether or not a given racemic modification has such beneficial properties and whether or not resolution of a given racemic modification is possible. Only rare compounds satisfy those requirements. At present, therefore, each pair of optically active enantiomers must be further studied experimentallly to determine whether selective crystallization can be accomplished, whereas a method of selective crystallization itself is advantageous for the purpose of commercial production of optically active amino acids. DL-α-aminophenylacetic acid cannot be resolved by such a method.

It has now been found that, when DL-α-aminophenylacetic acid is converted into ammonium N-acetyl-DL-α-aminophenylacetate, the said salt has many beneficial properties which make it suitable for selectively crystallizing it into each of its optically active enantiomers. These properties are as follows: The racemic modification of ammonium N-acetyl-α-aminophenylacetate is more soluble than both of the enantiomers thereof. A saturated solution of the racemic modification will not dissolve any more of the individual enantiomer. The supersaturated solution of an enantiomer is stable even after the selective crystallization of the other optically active enantiometer. Prompt crystallization of each of the enantiomers is afforded and an optically active enantiomer of ammonium N-acetyl-α-aminophenylacetate can be selectively crystallized out from a supersaturated solution of the racemic modification or from a supersaturated solution containing the racemic modification and one of the enantiomers.

An object of this invention is, therefore, to provide an economical and commercially useful process for the resolution of ammonium N-acetyl-DL-α-aminophenylacetate into each of its enantiomers. This process of the present invention is free of the disadvantages of the aforementioned known methods. Further, according to the process of the present invention, the desired optically active ammonium N-acetyl-α-aminophenylacetate can be obtained in a high yield. Another object of this invention is to provide a novel method for the industrial production of optically active α-aminophenylacetic acid derived from optically active ammonium N-acetyl-α-aminophenylacetate. Other objects of this invention will be apparent from the following description and claims.

The process, according to the present invention, comprises producing a supersaturated solution of ammonium N-acetyl-DL-α-aminophenylacetate in a solvent; seeding or dissolving one of the optically active enantiomers thereof into the solution thus making it predominant over the other enantiomer in the solution; allowing the predominant enantiomer to crystallize out; and then recovering it from the solution.

In one embodiment of the invention, a small amount of crystals of one of the enantiomers is added to the supersaturated solution as a seed and the mixture is stirred to cause selective crystallization of the enantiomer which is the same as that which was seeded. Alternatively, a small amount of one of the enantiomers is dissolved in a hot solution of the racemic modification in order to make the said enantiomer dominant over the other in the solution. The solution is then cooled whereby spontaneous crystallization of the predominant enantiomer takes place. It is also possible to combine these procedures. Namely, a partial amount of the crystals of one of the enantiomers is dissolved in the solution of the racemic modification and the remaining part is used to seed the supersaturated solution in which one of the enantiomers is dominant over the other. In this case, the seeding amount can be minimized. The supersaturated solution may be prepared from a solution of ammonium N-acetyl-α-aminophenylacetate in a suitable solvent by applying thereto conventional procedures as for example refrigeration, concentration, addition of appropriate solvents or a combination of these operations. For the preparation of the supersaturated solution thereof, however, it is most convenient to cool a hot solution saturated with ammonium N-acetyl-α-aminophenylacetate, as the solubility thereof increases with an increase in the temperature.

The seed crystals to be used should have the high optical purity. However, the equivalent mixture of D- and L-enantiomers may not always be used as the starting material for the resolution, but the non-equivalent mixture thereof can also be used for this purpose. It is rather convenient to use the non-equivalent mixture thereof as the starting material of the present invention, because the predominant enantiomer in the mixture may be spontaneously crystallized out from the supersaturated solution of said material. The preferred proportion of the seed to be added is about 0.05% based on the weight of the solution. However, it should be noted that the greater the amount of the seed, the better the resultant resolution. If the solution already contains an optically active enantiomer dominant over its antipode because of the natural occurrence of the seed crystals, the need for seeding with seed crystals of the optical enantiomer which is dominant over the other is obviated. Nevertheless, for smooth resolution seeding is preferred. Although the temperature at which the crystallization is carried out is not critical for the invention, a temperature of about room temperature is preferred. The crystallization is enhanced and made smoother by stirring the solution. Any inert solvent which can dissolve ammonium N-acetyl-DL-α-aminophenylacetate and which can crystallize out the compound as a conglomerate is suitable in the process of selective crystallization. Water, aqueous solvent, for example, a solution containing alkanols having up to 6 carbon atoms or a ketone having up to 6 carbon atoms are suitable for this purpose. From an industrial standpoint water is the most suitable solvent.

The mother liquor may be again employed for the optional resolution of the other enantiomer. For this purpose in order to produce the supersaturated solution of the enantiomorphic mixture, the mother liquor is concentrated or a suitable amount of the racemic modification is dissolved in the mother liquor, and then the procedure which has been carried out in the previous operation is repeated to separate the other enantiomer. In this case, if the amount of the racemic modification to be added is adjusted equal to the amount of the enantiomer previously separated, the same conditions with the previous operation can be afforded except that the predominant enantiomer in the solution is the antipode of the enantiomer previously separated. Thus the cycle of the operation may be repeated indefinitely, whereby the racemic modification supplied may be successively and entirely resolved into each of the D- and L-enantiomers.

The process of the present invention can be carried out not only by the batch system as mentioned above, but also by the continuous system which comprises, for example, the steps of passing the supersaturated solution through the column containing the seed crystals, and allowing an optically active ammonium N-acetyl-α-aminophenylacetate to crystallize out selectively in the said column. Alternatively, the process of the present invention can be carried out by immersing the seeding plates of optically active enantiomers in the supersaturated solution and allowing the optical enantiomers to crystallize out on the seeding plates.

The resulting crystals thus obtained may sometimes be optically impure due to the degree of a supersaturated solution and the amount of crystallization. The crude crystals, however, may be easily purified, because the solubility of the racemic modification is sufficiently higher than that of each enantiomer and the said optically active enantiomer will no longer dissolve in the saturated solution of the racemic modification. Namely, the optically pure crystals of ammonium N-acetyl-α-aminophenylacetate can be obtained by adding the crude crystals into a proper amount of solvent which is sufficient to be saturated or almost saturated with the racemic modification in said crude crystals, stirring the solution and recovering the resultant crystals for the solution. Alternatively, the optically pure crystals of ammonium N-acetyl-α-aminophenylacetate can be obtained by dissolving the crude crystals, for instance, at an elevated temperature in a small amount of solvent which dissolves the racemic modification in the crude crystals, allowing the said enantiomer to crystallize out and recovering it from the solution. Such operations as refrigeration, concentration, the addition of a solvent or combinations thereof may be applied for crystallization of the optically active enantiomer from the solution. Any inert solvents which are described above may also be used for this purpose. When only a small amount of solvent is needed due to low contents of the racemic modification in said crude crystals or due to the high solubility of the racemic modification, it is convenient to carry out the above operation by adding a suitable amount of the solution saturated with ammonium N-acetyl-DL-α-aminophenylacetate.

Optically active enantiomers of α-aminophenylacetic acid can be obtained from optically active ammonium N-acetyl-α-aminophenylacetate without racemization by treating with an acid such as hydrochloric acid or sulfuric acid and liberating the resultant optically active α-aminophenylacetic acid.

Ammonium N-acetyl-DL-α-aminophenylacetic acid, a starting compound of the present invention can be prepared by subjecting DL-α-aminophenylacetic acid to acetylation in an alkaline solution and neutralizing the resulting product with ammonia. Ammonium N-acetyl-α-aminophenylacetate is a novel compound in both forms of the racemic modification and of the optically active forms.

The physical property of ammonium N-acetyl-α-aminophenylacetate are shown in the following tables.

TABLE I

| Ammonium N-acetyl-α-aminophenylacetate | M.P. (decomp.) (° C.) | Specific rotation $[\alpha]_D^{25}$ (c.=1,000, water) |
| --- | --- | --- |
| DL-form | 197 | 0 |
| D-form | 196 | −182.5° |
| L-form | 196 | +182.5° |

TABLE II

| Temperature (° C.) | Solubility (g./100 gl. of water) | |
| --- | --- | --- |
|  | Optically active enantiomers | DL-form |
| 15 | 47.9 | 74.4 |
| 25 | 54.8 | 82.2 |
| 40 | 65.6 | 99.7 |

As will be apparent from the data represented by Tables I–II, a novel compound ammonium N-acetyl-α-aminophenylacetate has beneficial properties suitable for the selective crystallization into each of its optically active enantiomers.

EXAMPLE 1

88.5 g. of ammonium N-acetyl-DL-α-aminophenylacetate and 3.2 g. of ammonium N-acetyl-D-α-aminophenylacetate are dissolved in 100 ml. of water by heating. After cooling to 25° C., 50 mg. of ammonium N-acetyl-D-α-aminophenylacetate is seeded into the solution, and the solution is stirred for 60 minutes at the same temperature. The resulting crystals are collected by filtration whereby 6.1 g. of ammonium N-acetyl-D-α-aminophenylacetate are obtained.

$[\alpha]_D^{25} = -181.4°$ (c.=1, water)
Optical purity: 99.5%.

6 g. of the crystals are dissolved in 60 ml. of 2 N-hydrochloric acid. The solution is refluxed for 2 hours by heating, and then concentrated to dryness under reduced pressure. The residue thus obtained is dissolved in water and neutralized with 28% aqueous ammonia. The resulting crystals are collected by filtration whereby 4.0 g. of D-α- aminophenylacetic acid are obtained.

$[\alpha]_D^{25} = -167.0$ (c.=1, 5 N—HCl)

*Elemental analysis.*—Calculated for $C_8H_9NO_2$ (percent): N, 9.27. Found (percent): N, 9.28.

EXAMPLE 2

To the mother liquor obtained after isolation of ammonium N-acetyl-D-α-aminophenylacetate in Example 1, there are added 7.6 g. of ammonium N-acetyl-DL-α-aminophenylacetate, and the solution is heated until solution is complete. The solution is cooled to 25° C., seeded with 50 mg. of ammonium N-acetyl-L-α-aminophenylacetate and then stirred for 65 minutes at the same temperature. The resulting crystals are collected by filtration whereby 5.9 g. of ammonium N-acetyl-L-α-aminophenylacetates are obtained.

$[\alpha]_D^{25} = +177.7°$ (c.=1, water)
Optical purity: 97.5%

The crystals are recrystallized from water to yield 4 g. of ammonium N-acetyl-L-α-aminophenylacetate of the optical purity 100%.

The crystals thus obtained are treated with hydrochloric acid in the same manner as described in Example 1 whereby 2.7 g. of L-α-aminophenylacetic acid are obtained.

$[\alpha]_D^{25} = +167.0°$ (c.=1, 5 N —HCl

EXAMPLE 3

17.4 g. of ammonium N-acetyl-DL-α-aminophenylacetate are dissolved in 20 ml. of water by heating. After cooling to 25° C., 50 mg. of ammonium N-acetyl-D-α-aminophenylacetate is seeded into the solution. The solution is stirred for 65 minutes at the same temperature. The resulting crystals are collected by filtration, washed with a small amount of water and methanol, and dried whereby 0.45 g. of ammonium N-acetyl-D-α-aminophenylacetate are obtained.

$[\alpha]_D^{25} = -172.5°$ (c.=1, water)
Optical purity: 94.6%

*Elemental analysis.*—Calculated for $C_{10}H_{14}N_2O_3$ (percent): N, 13.32. Found (percent): N, 13.41.

EXAMPLE 4

The mother liquor obtained after isolation of ammonium N-acetyl-D-α-aminophenylacetate in Example 3 is heated. Then the solution is gradually cooled to 80 C. and stirred to cause the crystallization. After standing for 30 minutes at the same temperature, the resulting crystals are collected by filtration. The crystals thus obtained are treated in the same manner as described in Example 3 whereby 0.88 g. of ammonium N-acetyl-L-α-aminophenylacetate are obtained.

$[\alpha]_D^{25} = +181.4°$ (c.=1, water)
Optical purity: 99.5%

EXAMPLE 5

5.5 g. of ammonium N-acetyl-L-α-aminophenylacetate (optical purity: 74.4%) are added to a mixture of 1.73 ml. of water and 10 ml. of the solution saturated with ammonium N-acetyl-DL-α-aminophenylacetate at 25° C. The mixture is then heated until solution is complete. After cooling to 25° C., the solution is stirred vigorously for 2 hours at the same temperature. The resulting crystals are collected by filtration, washed with a small amount of water, acetone and dried whereby 4.10 g. of ammonium N-acetyl-L-α-aminophenylacetate are obtained.

$[\alpha]_D^{25} = +179.0°$ (c.=1, water)
Optical purity: 98.1%

EXAMPLE 6

8.00 g. of ammonium N-acetyl-D-α-aminophenylacetate (optical purity: 50%) are added to a mixture of 4.86 ml. of water and 25 ml. of the solution saturated with ammonium N-acetyl-DL-α-aminophenylacetate at 25 C. The mixture is then heated until solution is complete. The solution is stirred for 25 hours at 25°. C. The resulting crystals are collected by filtration and treated in the same manner as described in Example 5 whereby 3.81 g. of ammonium N-acetyl-D-α-aminophenylacetate are obtained.

$[\alpha]_D^{25} = -177.0$ (c.=1, water)
Optical purity: 97.0%

EXAMPLE 7

3.5 g. of ammonium N-acetyl-D-α-aminophenylacetate (optical purity: 74.2%) are added to 5.3 ml. of 95% (v./v.) aqueous methanol, and the mixture is heated to dissolve a partial amount of the crystals. The mixture is stirred for 30 hours at 30° C. The resulting crystals are collected by filtration whereby 2.63 g. of ammonium N-acetyl-D-α-aminophenylacetate are obtained.

$[\alpha]_D^{25} = -181.0°$ (c.=1, water)
Optical purity: 99.2%

What is claimed is:

1. A process for resolving ammonium N-acetyl-DL-α-aminophenylacetate into its optically active enantiomers which comprises the steps of adding crystals of one of said enantiomers to a solution of ammonium N-acetyl-DL-α-aminophenylacetate and supersaturating said solution whereby crystallization of said one of said enantiomers from the solution is initiated, then recovering the crystallized one of said enantiomers.

2. A process as claimed in claim 1 wherein said one of said enantiomers is added as seed crystals to the supersaturated solution of ammonium N-acetyl-DL-α-aminophenylacetate.

3. A process as claimed in claim 1 wherein said one of said enantiomers is added to the solution of ammonium N-acetyl-DL-α-aminophenylacetate at an elevated temperature, then the ammonium N-acetyl-DL-α-aminophenylacetate solution is cooled to produce said supersaturated solution.

4. A process as claimed in claim 1 wherein said one of said enantiomers is added to the solution of ammonium N-acetyl-DL-α-aminophenylacetate at an elevated temperature, then the ammonium N-acetyl-DL-α-aminophenylacetate solution is cooled to produce said supersaturated solution and the supersaturated solution is inoculated with seed crystals of said one of said enantiomers.

5. A process as claimed in claim 2 in which the amount of the seed crystals added is about 0.05 weight percent based on the weight of the solution.

6. A process as claimed in claim 1 in which the solution of ammonium N-acetyl-DL-α-aminophenylacetate is comprised of ammonium N-acetyl-DL-α-aminophenylacetate and an inert solvent, said solvent being water, or a mixture of water and a ketone having up to 6 carbon atoms or an alkanol having up to 6 carbon atoms.

7. A process as claimed in claim 1 further including the steps of dissolving, at elevated temperature, additional ammonium N-acetyl-DL-α-aminophenylacetate in mother liquor obtained after the recovery of said crystallized one of said enantiomers thereby producing another supersaturated solution, allowing crystallization to take place and recovering the crystallized other one of said enantiomers.

8. A process as claimed in claim 7, wherein said process is repeated a plurality of times whereby said optically active enantiomers are successively and alternately separated as crystals from the solution of ammonium N-acetyl-DL-α-aminophenylacetate.

9. A process as claimed in claim 8 further including the step of adding the crystals of one of said separated enantiomers into an amount of solvent which is sufficient to be saturated or almost saturated with ammonium N-acetyl-DL-α-aminophenylacetate, stirring this solution and recovering crystals which result.

10. A process as claimed in claim 8 further including the step of dissolving the crystals of one of said separated enantiomers into a solvent which dissolves any ammonium N-acetyl-DL-α-aminophenylacetate present in said crystals, allowing said dissolved one of said separated enantiomers to crystallize out and recovering it from the solution.

11. A process as claimed in claim 9 wherein said crystals of one of said separated enantiomers is added to a suitable amount of a solution saturated with ammonium N-acetyl-DL-α-aminophenylacetate.

12. A process as claimed in claim 10 wherein said crystals of one of said separated enantiomers is dissolved in a suitable amount of a solution saturated with ammonium N-acetyl-DL-α-aminophenylacetate.

13. A process for preparing optically active α-aminophenylacetic acid which comprises the steps of adding one optically active enantiomer of ammonium N-acetyl-DL-α-aminophenylacetate to a solution of ammonium N-acetyl-DL-α-aminophenylacetate, supersaturating the solution, permitting the one optically active enantiomer to crystallize from the supersaturated solution, recovering the crystallized one optically active enantiomer and reacting it with an acid to produce said optically active α-aminophenylacetic acid.

14. Ammonium N-acetyl-DL-α-aminophenylacetate.
15. Ammonium N-acetyl-D-α-aminophenylacetate.
16. Ammonium N-acetyl-L-α-aminophenylacetate.

References Cited

Greenstein, J. P. et al. Chemistry of the Amino Acids, vol. 1 (1961), pub. by John Wiley & Sons, Inc., New York, N.Y., p. 715, relied on.

LORRAINE A. WEINBERGER, Primary Examiner

L. A. THAXTON, Assistant Examiner